(12) United States Patent
Groutage

(10) Patent No.: US 6,522,996 B1
(45) Date of Patent: Feb. 18, 2003

(54) NON-STATIONARY/TRANSIENT SIGNAL FEATURE EXTRACTION SYSTEM

(75) Inventor: F. Dale Groutage, Kingston, WA (US)

(73) Assignee: The United States of America as represented by the Secretary of the Navy, Washington, DC (US)

(*) Notice: Subject to any disclaimer, the term of this patent is extended or adjusted under 35 U.S.C. 154(b) by 0 days.

(21) Appl. No.: 09/484,230

(22) Filed: Jan. 18, 2000

(51) Int. Cl.$^7$ .................................................. G06F 7/38
(52) U.S. Cl. ....................... 702/196; 702/189; 702/190; 702/198; 702/199
(58) Field of Search ................................ 702/189, 190, 702/196–199; 708/5, 444, 520

(56) References Cited

U.S. PATENT DOCUMENTS 6,105,016 A * 8/2000 Martin .......................... 707/1
6,178,261 B1 * 1/2001 Williams et al. ............ 382/190

OTHER PUBLICATIONS

Groutage, Dale "The Calculation of Features for Non–Stationary Signals from Moments of the SVD of Cohen–Posch (Positive Time–Frequency) Distributions," Proceedings of the IEEE–SP, Oct. 6–9, 1998, pp 605–608.*

* cited by examiner

Primary Examiner—Marc S. Hoff
Assistant Examiner—Felix Suarez
(74) Attorney, Agent, or Firm—Howard Kaiser

(57) ABSTRACT

Principal features are inventively derived from a non-stationary time series signal, and can be used to classify the attributes of the signal. Intrinsic to the invention is its recognition of the value of information contained within singular vectors. The invention therefore seeks to render singular vectors as proper density functions for purposes of formulating at least one feature of a signal, which is or has been sensed. To this end, the signal is typically evaluated thusly according to the invention: a time-frequency distribution (e.g., positive time-frequency distribution) matrix is generated; the time-frequency distribution matrix is decomposed; an element-by-element square of singular vectors is performed; the non-principal singular values are sorted and truncated; density functions are obtained; the density functions are normalized; and, at least one feature from the normalized density functions is formulated. The invention admits of utilization of any time-frequency distribution pursuant to the general formulation of Leon Cohen, first expounded in 1966; a positive time-frequency distribution may prove especially propitious for many applications.

29 Claims, 12 Drawing Sheets

NON-STATIONARY/TRANSIENT SIGNAL FEATURE EXTRACTION SYSTEM

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

The present invention relates to the evaluation of signals, more particularly to the classification of signal attributes of a non-stationary time series signal wherein such classification involves derivation of features thereof.

Non-stationary signals are used in almost every field of science and technology, such as the medical field, geophysical field, automobile manufacturing and submarine silencing (to name but a few). Some examples of non-stationary signals include, but are not limited to, the following: heartbeat electrocardiograms, seismic recordings, automobile vibration, and submarine acoustic transients.

Non-stationary signals are characterized by attributes that vary in some manner with time. It is for this reason that the study and analysis of such signals must involve a process that incorporates time. The most commonly uses process is termed time-frequency analysis. In general, time-frequency analysis is based on the construction of a two-dimensional distribution in time and frequency. In 1966, Leon Cohen developed a unifying formulation for time-frequency distributions with the correct marginals; see L. Cohen, "Generalized Phase-Space Distribution Functions," *J. Math. Phys.*, vol. 7, no. 5, pp 781–786, 1966, incorporated herein by reference. Cohen's generalized formulation stipulates that all time-frequency representations can be obtained from $$Q(t,f) = \frac{1}{2\pi}\int\int\int \left\{ s^*\left(u-\frac{1}{2}\tau\right) s\left(u+\frac{1}{2}\tau\right) \phi(\theta,\tau) e^{-j\theta t - j\tau 2\pi f + j\theta u} \right\} du\, d\tau\, d\theta \tag{1}$$

where $\phi(\theta,\tau)$ is a two dimensional function, called the kernel, which determines the distribution and its properties. Ideally, such a distribution should be manifestly positive, for a proper interpretation as a joint time-frequency energy density function, and further, should yield the correct marginal densities of time, $|s(t)|^2$, and frequency, $|S(f)|^2$.

Mathematically, for a time-frequency distribution to be interpreted as a joint time-frequency energy density, it must satisfy the two fundamental properties of nonnegativity and the correct frequency and time marginals:

$$Q(t,f) \geq 0 \tag{2}$$

$$\int_{-\infty}^{\infty} Q(t,f)\,dt = |S(f)|^2 \tag{3a}$$

$$\int_{-\infty}^{\infty} Q(t,f)\,df = |s(t)|^2 \tag{3b}$$

where $$S(f) = \int_{-\infty}^{\infty} s(t) e^{-j2\pi f t}\,dt$$

is the Fourier transform of the signal. Integrating the expression of (1) with respect to frequency yields the instantaneous power, $|s(t)|^2$, provided $\phi(\theta, 0)=1$. Likewise, integrating (1) with respect to time yields the energy density spectrum, $|S(f)|^2$, provided $\phi(0, \tau)=1$. When a time-frequency distribution meets the conditions of (2) and (3) it is termed a "positive time-frequency distribution".

As it turned out, even though the generalized formulation for all time-frequency distributions was specified as early as 1966, the condition for positivity was not known until several years later when Cohen and Posch, and also Cohen and Zaparovanny, gave the condition and a simple, general formulation for positive time-frequency distributions. See L. Cohen and T. Posch, "Positive Time-Frequency Distribution Functions," *IEEE Trans. Acoust. Speech Signal Processing* vol. ASSP-33, no. 1, pp 31–38, 1985, incorporated herein by reference; and, L. Cohen and Y. Zaparovanny, "Positive Quantum Joint Distributions," *J. Math. Phys.*, vol. 21, no. 4, pp 794–796, 1980, incorporated herein by reference. Thus, in 1985, it was known that positive time-frequency distributions could be constructed. However, it remained a secret of how to actually construct them for almost a decade.

It was not until 1994 that a means of constructing a positive time-frequency distribution using minimum cross-entropy was developed by Loughlin et al; see P. Loughlin, J. Pitton and L. Atlas, "Construction of Positive Time Frequency Distributions," IEEE *Trans. Sig. Proc.*, vol. 42, no. 10, pp 2697–2705, 1994, incorporated herein by reference. The method of Loughlin et al. was certainly a theoretical breakthrough in science; however, the usefulness of the original formulation was limited because of computational constraints. These constraints were alleviated by Groutage; see Dale Groutage, "A Fast Algorithm for Computing Minimum Cross-Entropy Positive Time-Frequency Distributions," *IEEE Trans. Sig. Proc.*, vol. 45, no. 8, August 1997, pp 1954–1970, incorporated herein by reference.

The positive time-frequency distribution is currently the only way known to quantify the energy density of a non-stationary signal—in particular, to obtain a plausible representation of the energy density with the correct marginals.

Once a two-dimensional time-frequency distribution has been constructed, it is natural from a mathematical viewpoint to construct the statistical moments. These moments can be useful for formulating features that associate with the non-stationary signal s(t). For a signal s(t), the temporal and spectral moments are given by $$\langle t^n \rangle = \int_{-\infty}^{\infty} t^n |s(t)|^2 dt \quad \text{and} \quad \langle f^m \rangle = \int_{-\infty}^{\infty} f^m |S(f)|^2 df \tag{4}$$

where (n,m=1,2,3, . . . ) respectively. The joint time-frequency moments are given by $$\langle t^n f^m \rangle = \int_{-\infty}^{\infty}\int_{-\infty}^{\infty} t^n f^m Q(t,f)\,dt\,df \quad \text{for } n,m = 1,2,3,\ldots \tag{5}$$

Currently there are numerous methodologies for deriving features from time series records and imagery, but none of these are entirely satisfactory. These methods use a variety of mathematical approaches to derive the features including the joint moments of equation (5). A desirable method would be an approach that derived features, which associate with temporal and spectral moments analogous to those of equation (4). Most of the methods are "ad hoc" and use a so-called "receipt" that searches for salient aspects of the time series record or image. These techniques are rather limited in scope, and search for a priori features, which are thought to be contained within the time series record.

A known method which is not based on searching for a priori features is disclosed by L. M. D. Owsley et al; see L. M. D. Owsley, L. E. Atlas, and G. D. Bernard, "Self-Organizing Feature Maps and Hidden Markov Models for Machine-Tool Monitoring," *IEEE Transactions on Signal Processing,* vol. 45, no. 11, November 1997, pp 2787–2798, hereby incorporated herein by reference. Owsley et al. disclose the most current methodology not based upon a priori feature search, a methodology involving the so-called "Self Organizing Feature Map."

Essentially, according to Owsley et al., a "codebook" is generated that contains vectors derived from a series of non-stationary signals from a given class of signals. The codebook contains an address for each vector. For the two-dimensional case, the address of each vector is its location in terms of the row-column that it resides. For example, a 5 by 5 codebook has 5 rows and 5 columns. Location (2,3) is for the vector residing at location occupied by the second row and third column. A test vector is compared to the vectors in the code book and the code book vector that matches the closest (via some technique such as the Euclidean Norm) is assigned the address associated with that vector in the code book. The feature for the test vector is the two-digit address.

Marinovic and Eichmann disclose a known method which is more closely associated with the presently inventive method than that which is disclosed by Owsley et al. See N. M. Marinovic and G. Eichmann, "Feature Extraction and Pattern Classification in Space-Spatial Frequency Domain," *Proc. SPIE,* vol. 579, Conf. on Intelligent Robots and Computer Vision, Sep. 15–20, 1985, Cambridge, Mass., incorporated herein by reference; and, N. M. Marinovic and G. Eichmann, "An Expansion of Wigner Distribution and its Applications," *Proceedings of the IEEE ICASSP-85,* vol. 3, pp 1021–1024, 1985, incorporated herein by reference.

Leon Cohen references the work of Marinovic and Eichmann. See L. Cohen, *Time-Frequency Analysis,* Prentice-Hall, New York, 1995, incorporated herein by reference; see especially, pp 190–191, incorporated herein by reference. See also, L. Cohen, "Time-Frequency Distributions—A Review," *Proceedings of the IEEE,* vol. 77, no. 7, July 1989, pp 941–981, incorporated herein by reference. In particular, this method according to Marinovic and Eichmann uses Singular Value Decomposition (SVD) of the Wigner time-frequency distribution, and then suggests that the features are contained in the singular values.

Nevertheless, the method disclosed by Marinovic, Eichmann and Cohen has its shortcomings. Marinovic, Eichmann assigns import to the singular values. In reality, however, the singular values are pure numbers and do not contain pertinent information about the time series process. The truly pertinent information is contained in the singular vectors. However, the singular vectors are not proper density functions; thus, for the most part, the singular vectors are ignored by Marinovic, Eichmann, unrecognized by Marinovic, Eichmann as being a source of key features about the time series process.

Accordingly, there still exists a need, unfulfilled by current methodologies, to effectively derive features from a non-stationary time series signal, so that these features can be efficaciously utilized for classifying the attributes of the signal. In the medical field, for instance, the principal features could be used for non-intrusive diagnostics to detect malfunctions of internal organs. An example of such a malfunction would be the failure of a heart valve. The unique features derived from the recorded time series of the human heart could be used to classify the medial condition.

SUMMARY OF THE INVENTION

In view of the foregoing, it is an object of the present invention to provide method and apparatus for deriving features (especially, principal features) from a non-stationary time series signal, wherein such features can be used to classify the signal attributes.

The present invention provides a unique methodology for deriving, from a non-stationary time series signal, principal features, which can be used to classify the signal attributes. The new method of this invention inherently recognizes the value of the information contained within the singular vectors derived from the singular value decomposition (SVD) of a time-frequency distribution constructed from the associated time series. Accordingly, the inventive method alters the singular vectors such that they become proper density functions wherein principal features can be derived therefrom. Furthermore, by using this approach (since by construction, the SVD separates time and frequency), temporal and spectral moments can be used to derive features, as opposed to joint time and frequency moments.

The non-stationary signal feature extraction system according to this invention uses density functions derived from the singular value decomposition (SVD) of Cohen-Posch positive time-frequency distributions as well as other time-frequency distributions. According to frequent inventive practice, the time-frequency distributions are positive time-frequency distributions; nevertheless, according to this invention, the time-frequency distributions need not be positive time-frequency distributions.

In accordance with the present invention, the time-frequency distribution can be any time-frequency distribution which is obtainable from Cohen's generalized formulation, wherein Cohen's generalized formulation is given by the above-noted equation (1), viz.:

$$Q(t, f) = \frac{1}{2\pi} \int \int \int \left\{ s^*\left(u - \frac{1}{2}\tau\right) s\left(u + \frac{1}{2}\tau\right) \phi(\theta, \tau) e^{-j\theta t - j\tau 2\pi f + j\theta u} \right\} du\, d\tau\, d\theta.$$

Generally speaking, according to the present invention, the density functions are derived from the singular value decomposition of time-frequency distributions. An emphasis of this invention is on the Cohen-Posch positive time-frequency distributions, which are preferably used for many embodiments of this invention. The positive time-frequency distribution is always manifestly positive and always yields the correct marginal densities of time and frequency. When the features are derived from singular value decomposition (SVD) of Cohen-Posch positive time-frequency distributions, the features associate with energy density highlights; this represents an advantage of inventively implementing a Cohen-Posch positive time-frequency distribution.

Nevertheless, the inventive methodology is not restricted to Cohen-Posch positive time-frequency distributions. Other time-frequency distributions (i.e., "non-positive" time-frequency distributions), such as the spectrogram distribution or the Wigner distribution (to name but a couple), can also be used in accordance with the present invention. Utilization of a spectrogram, for instance, may be advantageous insofar as being speedier in application.

Any "discrete time" (as distinguished from "continuous time") time-frequency distribution, by definition, will be susceptible to being expressed in mathematical matrix form, and hence will lend itself to inventive practice. In the light of this disclosure, the ordinarily skilled artisan will be capable of practicing this invention in association with any of a variety of time-frequency distribution genres.

An inventive method for deriving at least one feature from a non-stationary time series signal, typically wherein said at least one feature is suitable for classifying at least one attribute of the signal, comprises: based on the signal, generating a time-frequency distribution matrix; decomposing the time-frequency distribution matrix; performing an element-by-element square of singular vectors; sorting and truncating the non-principal singular values; obtaining density functions; normalizing the density functions; and, formulating at least one feature from the normalized density functions.

In accordance with typical embodiments of the present invention, a method for deriving features from a non-stationary time series signal comprises the following steps: generating a time-frequency distribution matrix, preferably a positive time-frequency distribution matrix (this step corresponding to what is termed herein "sub system number one"); decomposing the positive time-frequency distribution matrix (this step corresponding to what is termed herein "sub system number two"); performing an element-by-element square of the singular vectors, thereby formulating the density functions (this step corresponding to what is termed herein "sub system number three"); sorting and truncating all but the principal singular values (this step corresponding to what is termed herein "sub system number four"); weighting the element-by-element square of the singular vectors by the principal singular values (this step corresponding to what is termed herein "sub system number five"); normalizing the density functions formulated by the weighting of the element-by-element square of the singular vectors (this step corresponding to what is termed herein "sub system number six"); and, formulating features (e.g., moments or other quantities) from the normalized density functions (this step corresponding to what is termed herein "sub system number seven").

The present invention can be efficaciously practiced in association with known computer technology.

Some embodiments of the present invention provide a machine having a memory. The machine contains a data representation of at least one feature derived from a non-stationary time series signal, typically wherein at least one feature is suitable for classifying at least one attribute of the signal. The data representation is generated, for availability for containment by the machine, by the method comprising: based on the signal generating a time-frequency distribution matrix (e.g., a positive time-frequency distribution matrix); decomposing the time-frequency distribution matrix; performing an element-by-element square of singular vectors; sorting and truncating the non-principal singular values; obtaining density functions; normalizing the density functions; and, formulating at least one feature from the normalized density functions.

Some embodiments of the present invention provide a memory for storing data for access by an application program being executed on a processing system. The memory comprising a data representation of at least one feature derived from a non-stationary time series signal, typically wherein at least one feature is suitable for classifying at least one attribute of said signal. The data representation is stored in the memory and includes information resident in a database used by the application program. The data representation is generated, for availability for storage in said memory, by the method comprising: based on the signal, generating a time-frequency distribution matrix (e.g., a positive time-frequency distribution matrix); decomposing the time-frequency distribution matrix; performing an element-by-element square of singular vectors; sorting and truncating the non-principal singular values; obtaining density functions; normalizing the density functions; and, formulating at least one feature from the normalized density functions.

Other objects, advantages and features of this invention will become apparent from the following detailed description of the invention when considered in conjunction with the accompanying drawings.

BRIEF DESCRIPTION OF THE APPENDICES

The following appendices are hereby made a part of this disclosure:

Attached hereto marked APPENDIX A and incorporated herein by reference is the following manuscript which discloses various aspects of the present invention: Dale Groutage and David Bennink, "Feature Sets for Non-Stationary Signals Derived from Moments of the Singular value decomposition of Cohen-Posch (Positive Time-Frequency) Distributions," submitted (Mar. 16, 1998) to the *IEEE Transactions on Signal Processing*, accepted for publication. This manuscript includes a cover page, plus 34 pages of text, plus 23 sheets of drawings.

BRIEF DESCRIPTION OF THE DRAWINGS

In order that the present invention may be clearly understood, it will now be described, by way of example, with reference to the accompanying drawings, wherein like numbers indicate the same or similar components, and wherein.

DETAILED DESCRIPTION OF THE INVENTION

Figure 1:
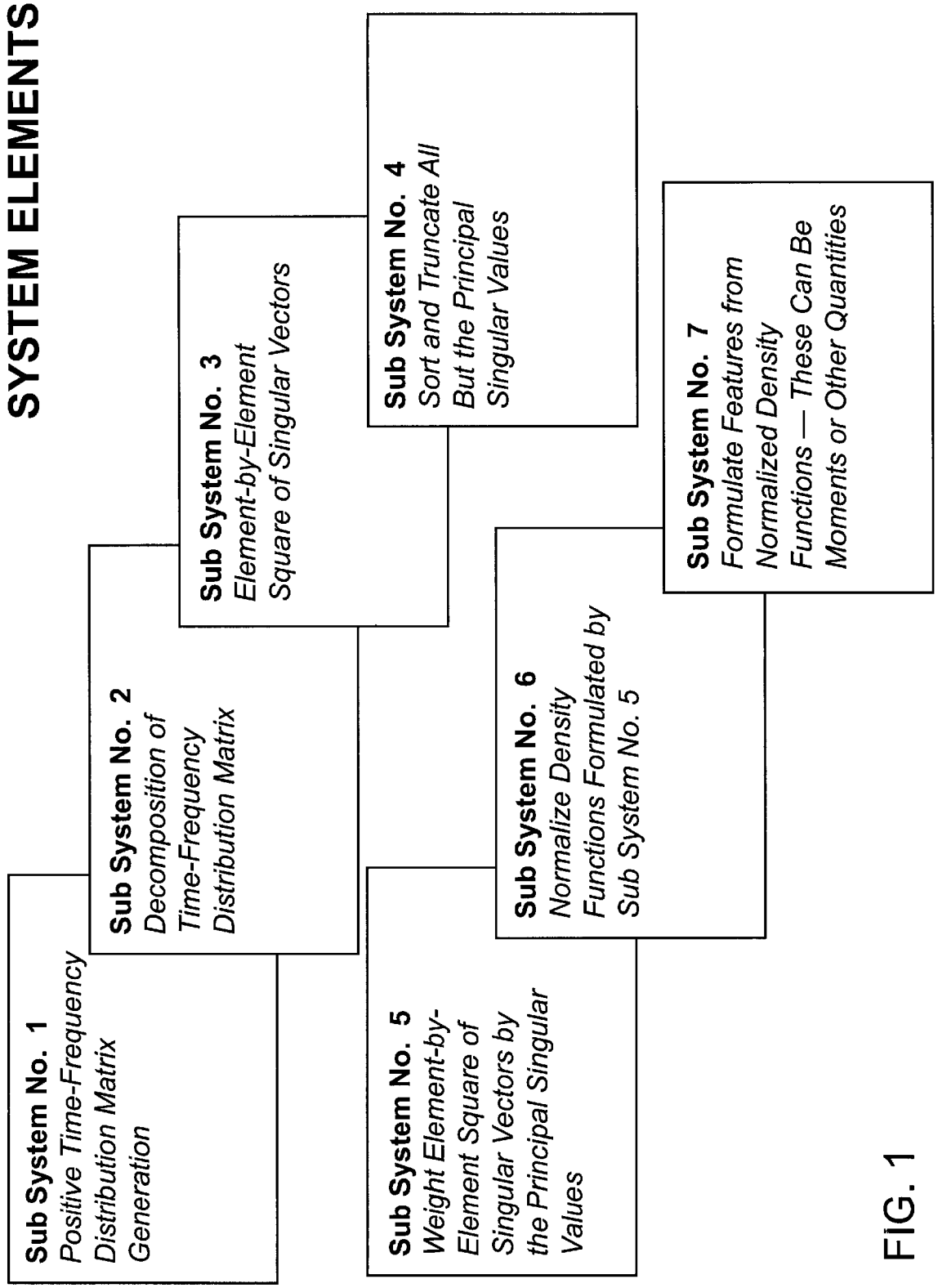
FIG. 1 is a block diagram showing the seven major "sub systems" included in typical embodiments of the feature extraction system of the present invention.

Referring now to FIG. 1, a high-level block diagram, the inventive feature extraction system comprises seven system elements, viz., seven major "sub systems" (sub system numbers one through seven), which are sequentially represented in FIG. 2 through FIG. 8.

Figure 2:
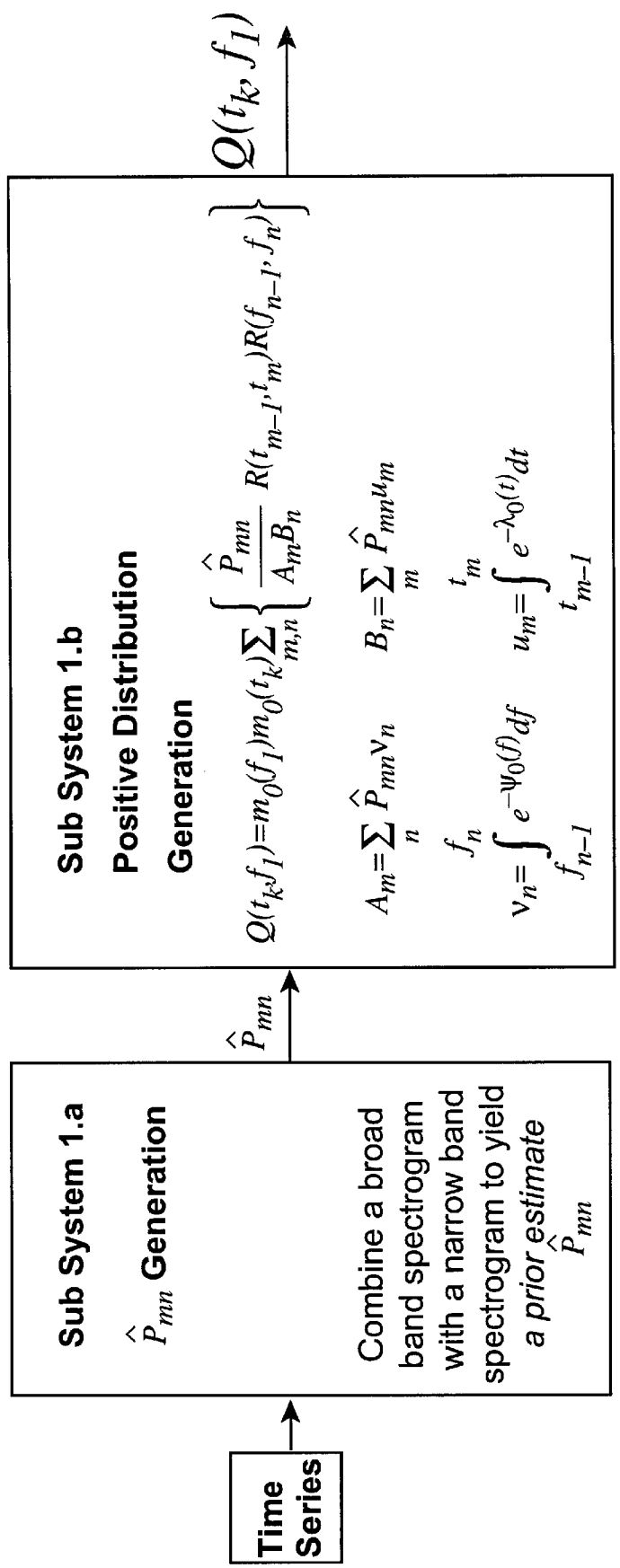
FIG. 2 is a block diagram illustrating operation of "sub system number one" (sub system 1.0) shown in FIG. 1.

With reference to FIG. 2, the first operation that must be performed on the time series record is the generation of a time-frequency distribution (TFD) matrix. Note that FIG. 2 refers to the generation of a positive time-frequency distribution (PTFD). If a time-frequency distribution other than a positive time-frequency distribution is used, FIG. 2 will be slightly altered to reflect this. For the case of the PTFD, FIG. 2 illustrates the operation of sub system number one. The first portion, sub system 1.a, generates the prior estimate $\hat{P}_{mn}$ that is based on the combination of broad band and narrow band spectrograms. The second portion, sub system 1.b, generates a time-frequency distribution (TFD) which is a positive time-frequency distribution (PTFD).

This prior estimate $\hat{P}_{mn}$ is used to generate PTFD's via the algorithm that is described herein in subsequent paragraphs. The PTFD is chosen because it will result in a feature set that associates with the physical quantity, energy density. This is because positive time-frequency distributions are the only TFD's that provide a description of the energy density in the time-frequency plane—that is, how the energy is jointly distributed in time and frequency (time-frequency plane). The inventive method avails itself of this attribute insofar as identifying the energy density highlights in terms of location in time, duration, center frequency and bandwidth of each energy highlight. Distributions that do not yield a correct representation of the energy density are not useful for the basis of deriving features sets associated with energy density.

An example of a TFD which does not yield a correct representation of the energy density is one which places the energy density highlights in incorrect locations in the time-frequency plane and/or smears the energy density highlights over regions in the time-frequency plane where they do not belong. For example, the Wigner Distribution, disclosed by E. Wigner can place artifacts in the time-frequency representation of the energy density. See E. Wigner, "On the quantum correction for thermodynamic equilibrium," Phys. Rev., vol. 40, pp. 749–759, 1932, incorporated herein by reference. See also E. Wigner, "Quantum-mechanical distribution functions revisited," in *Perspectives in Quantum Theory*, W. Yourgrau and A. van der Merwe, (Ed.), MIT Press, Cambridge, Mass., 1971, incorporated herein by reference. Another example is the so-called spectrogram time-frequency distribution. The spectrogram can be used as a joint time-frequency representation of energy density. However, the spectrogram always presents a smeared representation of the energy density. Furthermore, the spectrogram is constructed via a window technique and will yield a different representation for the energy density for each different window used to construct it. For the most part, the choice of the window is arbitrary.

The discrete-time PTFD is a matrix of numbers wherein the rows represent the sub elements in frequency and the columns represent the sub elements in time. For instance, a matrix that has 500 rows and 600 columns would have 500 discrete points in frequency and 600 discrete points in time. The discrete-time PTFD matrix is designated as $Q(t_k,f_l)$, where k=1,2, . . . ,m, and l=1,2, . . . ,n.

Dale Groutage, "A Fast Algorithm for Computing Minimum Cross-Entropy Positive Time-Frequency Distributions", *IEEE Transactions on Signal Processing*, Vol. 45, No. 8, August 1997, pp 1954–1970, incorporated herein by reference, presents the development of the algorithm that generates $Q(t_k,f_l)$. In particular, for the case of two marginal constraints, the algorithm is $$u_m \sum_n \hat{P}_{mn} v_n = \int_{t_{m-1}}^{t_m} m_0(t) dt \tag{6}$$

$$v_n \sum_m \hat{P}_{mn} u_m = \int_{f_{n-1}}^{f_n} m_0(f) df \tag{7}$$

$$Q(t, f) = m_0(f) m_0(t) \sum_{m,n} \left\{ \frac{\hat{P}_{mn}}{A_m B_n} R(t_{m-1}, t_m) R(f_{n-1}, f_n) \right\} \tag{8}$$

Equation (8) is a continuous formulation of the time-frequency distribution Q(t,f). The discrete form of the algorithm of equation (8) for k=1,2, . . . ,N and l=1,2, . . . ,M is $$Q(t_k, f_l) = m_0(f_l) m_0(t_k) \sum_{m,n} \left\{ \frac{\hat{P}_{mn}}{A_m B_n} R(t_{m-1}, t_m) R(f_{n-1}, f_n) \right\} \tag{9}$$

In both (8) and (9), $R(x_a,x_b)$ is the rectangle basis set; see Dale Groutage, "A Fast Algorithm for Computing Minimum Cross-Entropy Positive Time-Frequency Distributions," *IEEE Trans. Sig. Proc.*, vol. 45, no. 8, August 1997, pp 1954–1970, incorporated herein by reference.

Also, $$A_m = \sum_n \hat{P}_{mn} v_n; \quad B_n = \sum_m \hat{P}_{mn} u_m \tag{10}$$

and $$v_n = \int_{f_{n-1}}^{f_n} e^{-\psi_0(f)} df; \quad u_m = \int_{t_{m-1}}^{t_m} e^{-\lambda_0(t)} dt \tag{11}$$

Figure 3:
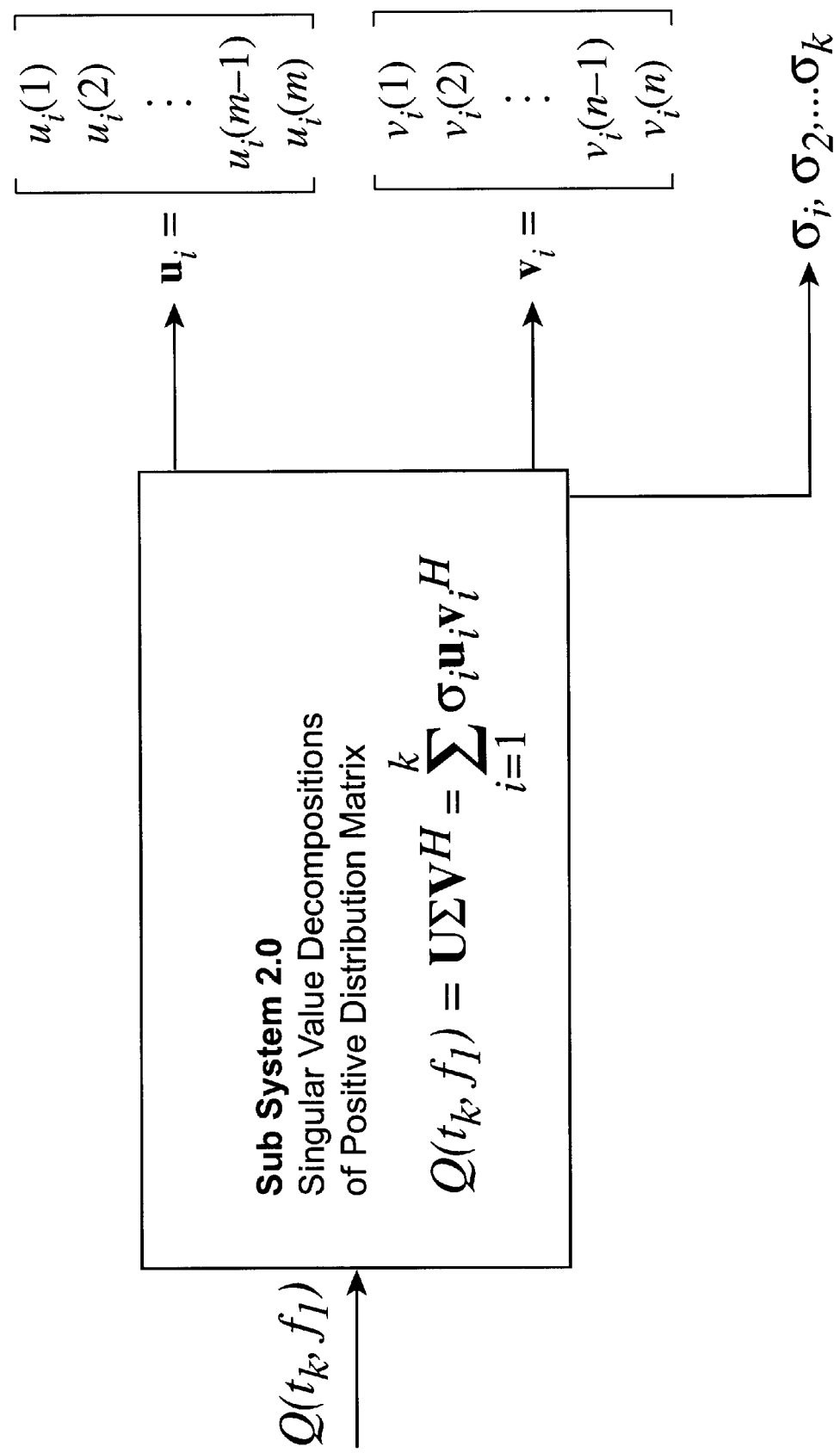
FIG. 3 is a block diagram illustrating operation of "sub system number two" (sub system 2.0) shown in FIG. 1.

Reference now being made to FIG. 3, operation according to sub system two includes decomposing the discrete-time PTFD into a series of sub-matrices, where each sub-matrix is multiplied by a weight function. The discrete-time PTFD matrix, $Q(t_k,f_l)$, which for purposes of brevity is designated as the matrix A, is decomposed into a subset of matrices, where each sub-matrix $A_i$ is multiplied by a weight $\sigma_i$. The following expression symbolizes this decomposition:

$$Q(t_k, f_l) = A = \sum_{i=1}^{k} \sigma_i A_i \tag{12}$$

Although this can be accomplished in a variety of ways, one convenient approach is given by the singular value decomposition (SVD) theorem disclosed by Lawson and Hanson, Forsythe et al. and Klema and Laub. See the following references, each of which is incorporated herein by reference: C. L. Lawson and R. J. Hanson, *Solving Least Squares Problems*, Prentice-Hall, Inc., Englewood Cliffs, N.J., 1974; G. E. Forsyth, M. A. Malcolm, and C. B. Moler, *Computer Methods for Mathematical Computations*, Prentice-Hall, Inc., Englewood Cliffs, N.J., 1977; Virginia C. Klema, and Alan J. Laub, "The Singular value decomposition: Its Computation and Some Applications", *IEEE Trans. Autom. Control*, Vol. AV-25, pp 164–176, April 1980. This theorem states that for an mxn complex-valued matrix A, of rank k, there exist positive real numbers $\sigma_1 \geq \sigma_2 \geq \sigma_3 \geq \ldots \geq \sigma_k > 0$ (the singular values), an m×m unitary matrix $U=[u_1 \ldots u_m]$, and an n×n unitary matrix $V=[v_1 \ldots v_n]$, such that the matrix A can be expressed as $$A = U\Sigma V^H = \sum_{i=1}^{k} \sigma_i u_i v_i^H \quad (13)$$

H is Hermitian transpose and the m×n matrix $\Sigma$ has the structure $$\Sigma = \begin{pmatrix} D & 0 \\ 0 & 0 \end{pmatrix}, \quad (14)$$

where $D=\text{diag}(\sigma_1, \ldots, \sigma_k)$ is a k×k diagonal matrix. Equation (12) can also be written in the form of equation (13) with $$A_i = u_i v_i^H \quad (15)$$

Also, the $u_1$ and $v_i$ vectors are the ith columns of the U and V matrices respectively, i.e., $$u_i = \begin{bmatrix} u_i(1) \\ u_i(2) \\ \vdots \\ u_i(m-1) \\ u_i(m) \end{bmatrix} ; \quad v_i = \begin{bmatrix} v_i(1) \\ v_i(2) \\ \vdots \\ v_i(n-1) \\ v_i(n) \end{bmatrix} \quad (16)$$

and are termed the singular vectors. The outputs of Sub System 2.0 are the $u_i$ and $v_i$ vectors and the singular values $\sigma_i$. All of the information that is contained in the A matrix is also contained in the subset of matrices $A_i$ and the $\sigma_i$. The idea of such a decomposition is that the information in the A matrix can be extracted in an ordered manner via the $A_i$. This can be applied to the discrete m×n positive time-frequency distribution, $Q(t_k, f_l)$, where k=1,2, . . . ,m, and l=1,2, . . . ,n. Since this matrix contains information about the joint time-frequency aspects of a non-stationary time series process, the decomposition provides a means of extracting time and frequency information from the process in terms of features.

The features of the time series process are completely contained within the A matrix (discrete, positive time-frequency distribution matrix) as well as the complete set of $A_i$ sub-matrices and the $\sigma_i$. What follows herein is an inventive method for determining the time-frequency structures (features) of the distribution based not only on the singular values, $\sigma_i$, but also on the sub-matrices $A_i = u_i v_i^H$. The method is a two-step process; the first step is the decomposition, the second step is the calculation of statistical moments using density functions derived from the decomposed time-frequency distribution. This is based on the fact that the positive time-frequency A matrix is a proper density function $$A(i,j) \geq 0 \text{ for all } i,j \quad (17)$$

$$\sum_{i=1}^{m} \sum_{j=1}^{n} A(i,j) \equiv 1 \quad (18)$$

Equation (12) is a decomposition of the matrix A in terms of an ordered set of sub-matrices $A_i$ created from the outer product of the two singular vectors $u_i$ and $v_i$. The actual time and frequency information is contained completely within the A matrix. The problem, however, with looking at just the m×n A matrix (the left side of equation (12) is the separation of principal features from the large amount of data contained within this single matrix. The decomposition of equation (12), as noted in equation (13), separates the features into the $u_i$ and $v_i$ vectors. The right side of equation (12) is a series of sub-matrices $A_i$ and offers a solution to the large data problem, provided that each sub-matrix associates with only a few features of the time series process. The problem with the $A_1$ sub-matrices is that they are not proper density functions. Nothing guarantees that these matrices will be strictly positive, leading to the idea of using vectors composed of the squared elements, or element-by-element products of $u_i$ and $v_i$ vectors. The resultant matrices formed by the outer products of these new vectors will be strictly positive. The vectors composed of the squared elements, or element-by-element products, of $u_1$ and $v_i$ are designated by $\tilde{u}_i$ and $\tilde{v}_i$. Similarly, the matrices composed of squared elements of $A_i$ are designated by $\tilde{A}_1$.

It turns out that the vectors $\tilde{u}_1$ and $\tilde{v}_i$ are time and frequency marginals of the matrices $\tilde{A}_i$. This is the basis of the new method of the present invention for determining features of time series processes. That the vectors $\tilde{u}_1$ and $\tilde{v}_i$ are time and frequency marginals is shown herein as follows:

The i,j elements of $\tilde{A}_n$ are $$\tilde{A}_n(i,j) = A_n^2(i,j) \quad (19)$$
$$= u_n^2(i) v_n^2(j)$$

Also, $$\tilde{A}_n(i,j) = \tilde{u}_n(i) \tilde{v}_n(j) \quad (20)$$

Summing the $\tilde{A}_n(i,j)$ over j, which (for the current convention) corresponds to frequency, yields $$\sum_{j=1}^{n} \tilde{A}_n(i,j) = \tilde{u}(i) \sum_{j=1}^{n} \tilde{v}_n(j) \quad (21)$$

But, since the $v_n$ are orthonormal $$\sum_{j=1}^{n} \tilde{v}_n(j) \equiv 1 \quad (22)$$

Thus, the frequency marginal of $\tilde{A}_n(i,j)$ is simply the vector whose elements are $u^2(i)$ for i=1,2, . . . ,m. Likewise, the time marginal of $\tilde{A}_n(i,j)$ is simply the vector whose elements are $v^2(j)$ for j=1,2, . . . ,n. Note that $\tilde{A}_n$, $\tilde{u}_n$, and $\tilde{v}_n$ are proper density functions, i.e., $$\sum_{i=1}^{m} \sum_{j=1}^{n} \tilde{A}_n(i,j) \equiv 1 \quad (23)$$

and $\tilde{u}_n(i) \geq 0$ for all i, $\tilde{v}_n(j) \geq 0$ for all j and $$\sum_{i=1}^{m} \tilde{u}_n(i) \equiv 1 \qquad (24)$$

$$\sum_{j=1}^{n} \tilde{v}_n(j) \equiv 1 \qquad (25)$$

By construction, $\tilde{A}_n$ are completely characterized by the $\tilde{u}_n$, and $\tilde{v}_n$. In essence, the $\tilde{A}_n$ matrices separate time and frequency information. This leads to the concept of defining time and frequency features based on these time and frequency marginals $\tilde{u}_n$, and $\tilde{v}_n$. Localized, distinct features in time and frequency contained within a positive time-frequency distribution, which is a joint function of time and frequency, can be distinctly separated.

Figure 4:
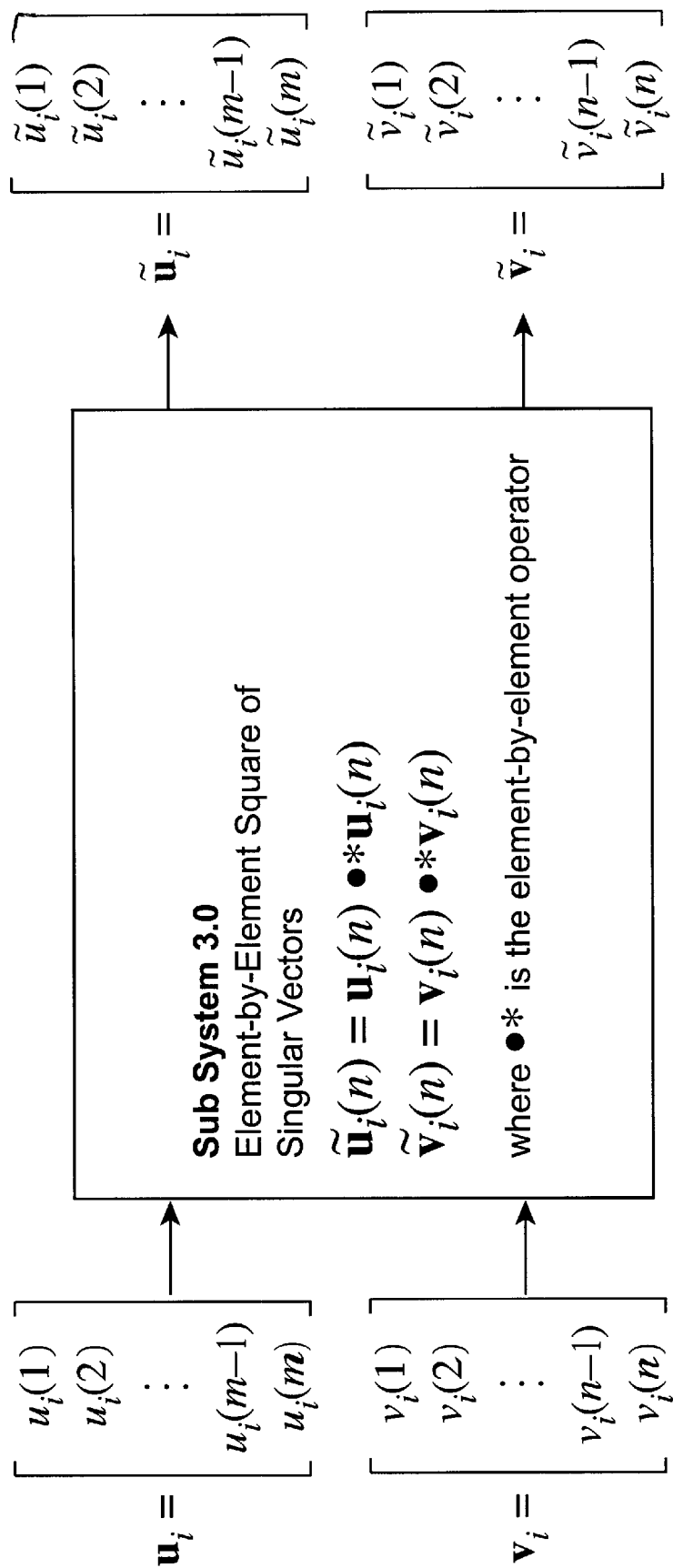
FIG. 4 is a block diagram illustrating operation of "sub system number three" (sub system 3.0) shown in FIG. 1.
Figure 5:
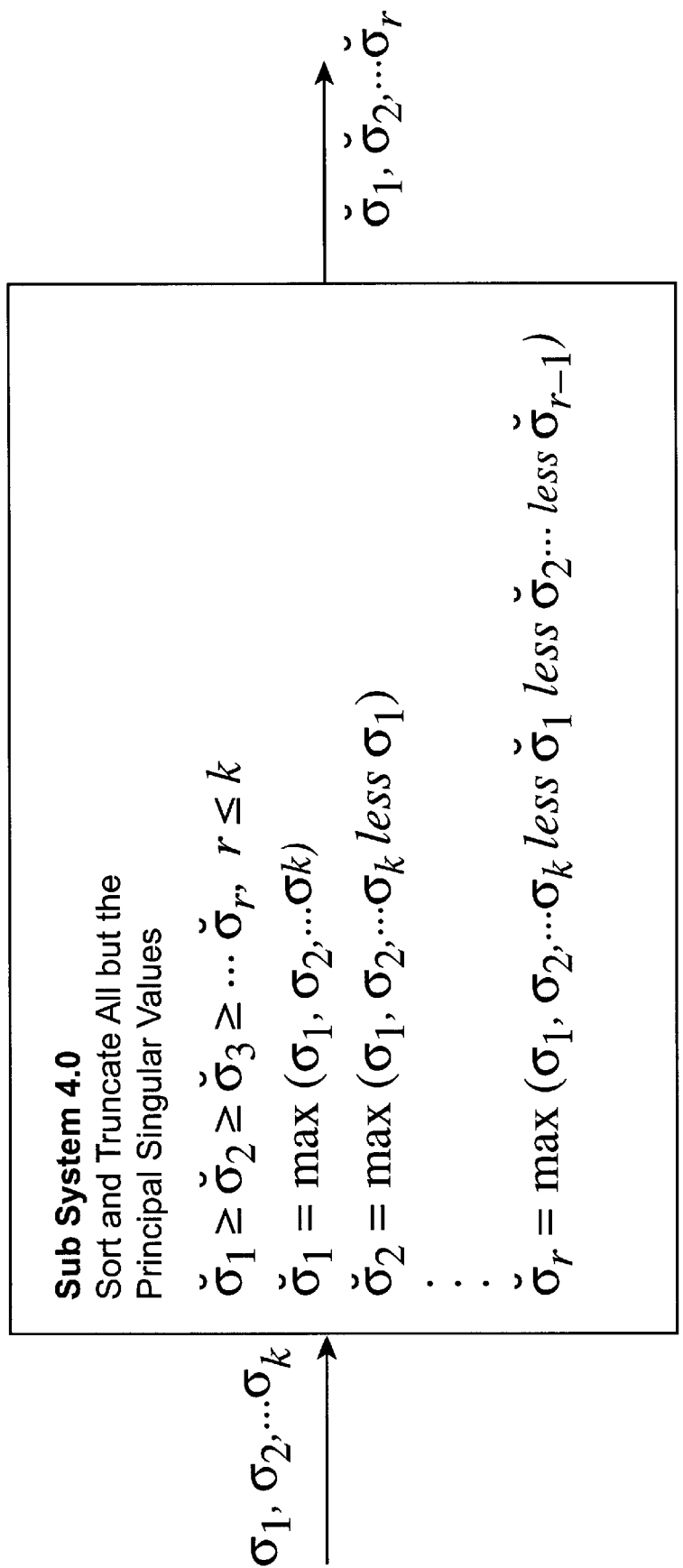
FIG. 5 is a block diagram illustrating operation of "sub system number four" (sub system 4.0) shown in FIG. 1.

Reference is now made to FIG. 4 and FIG. 5. FIG. 4 depicts the operation of sub system 3, which is the sub system that formulates the density functions $\tilde{u}_n$ and $\tilde{v}_n$. Note that this is an element-by-element square operation, which in FIG. 4 is designated by the symbol ".*". The function of sub system 4, illustrated in FIG. 5, is to sort and truncate the singular values and corresponding singular vectors.

The singular values are ordered from largest to smallest. This operation is symbolized as follows:

$$\check{\sigma}_1 \geq \check{\sigma}_2 \geq \check{\sigma}_3 \geq \ldots \geq \check{\sigma}_r, r \leq k$$

$\check{\sigma}_1 = \max(\sigma_1, \sigma_2, \ldots \sigma_k)$
$\check{\sigma}_2 = \max(\sigma_1, \sigma_2, \ldots \sigma_k \text{ less } \check{\sigma}_1)$
$\ldots$
$\check{\sigma}_r = \max(\sigma_1, \sigma_2, \ldots \sigma_k \text{ less } \check{\sigma}_1 \text{ less } \check{\sigma}_2 \ldots \text{ less } \check{\sigma}_{r-1})$ The largest singular value is designated as $\check{\sigma}_1$. The next largest is designated as $\check{\sigma}_2$, and so forth. The set containing the largest singular values and associated singular vectors is designated as the principal set of singular values and vectors. Where to truncate is somewhat arbitrary. However, as a rule-of-thumb, it is when the $\check{\sigma}_r$ has diminished by 10 dB, where $\check{\sigma}_r$ is the corresponding singular value that is at least −10 dB less than $\check{\sigma}_1$, i.e., $$10 \text{Log} \frac{\check{\sigma}_r}{\check{\sigma}_1} \leq -10 \text{ dB}.$$

Once the singular values are ordered, the dominate ones can be used to associate with the principal information about the underlying process, such as the energy density highlights in the time-frequency domain. See Richard A. Johnson and Dean W. Wichem, *Applied Multivariate Statistical Analysis*, Prentice-Hall, Inc., Englewood Cliffs, N.J., 1988 incorporated herein by reference. This provides a means of identifying principal features in this domain.

Figure 6:
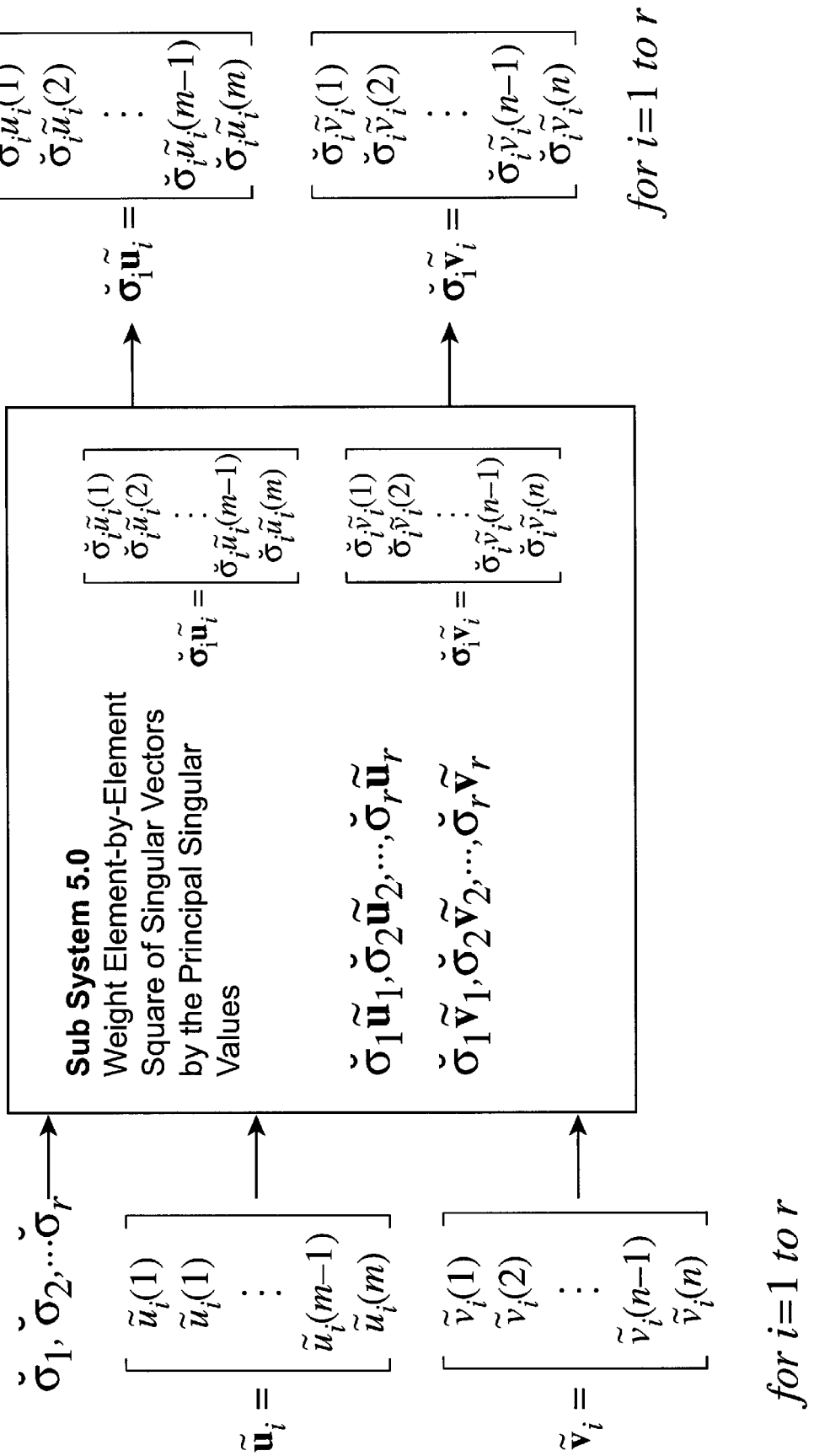
FIG. 6 is a block diagram illustrating operation of "sub system number five" (sub system 5.0) shown in FIG. 1.
Figure 7:
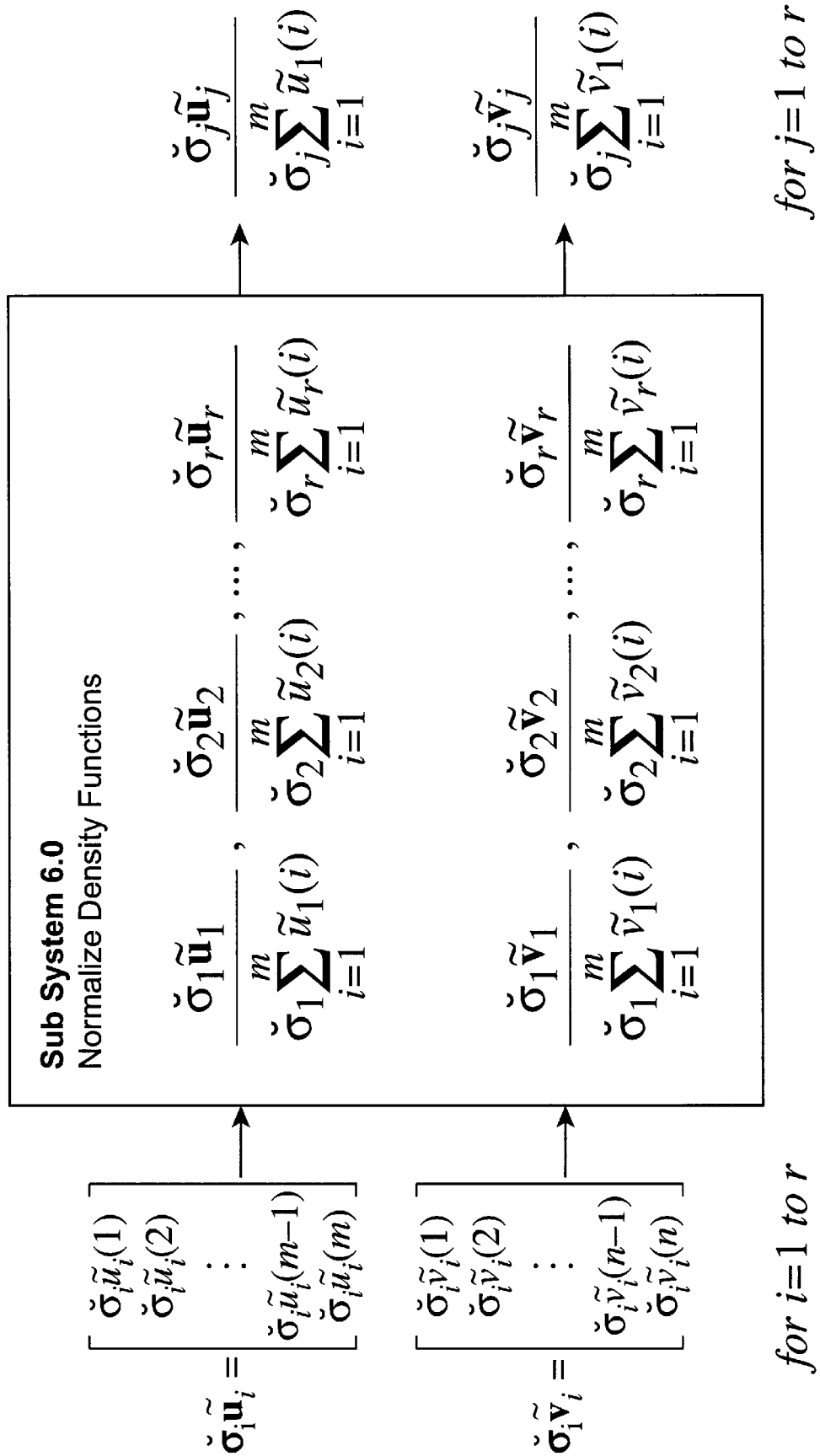
FIG. 7 is a block diagram illustrating operation of "sub system number six" (sub system 6.0) shown in FIG. 1.

Referring to FIG. 6 and FIG. 7, FIG. 6 illustrates the operation of sub system 5, and FIG. 7 illustrates the operation of sub system 6. The operation of sub system 5 is the weighting of the $\tilde{u}_n$ and $\tilde{v}_n$ density vectors. The operation of sub system 6 is the normalization of these vectors. The normalization is accomplished by finding the sum of all values of each $\tilde{u}_n$ and $\tilde{v}_n$, then dividing each element of $\tilde{u}_n$ and $\tilde{v}_n$ by its corresponding sum value.

Figure 8:
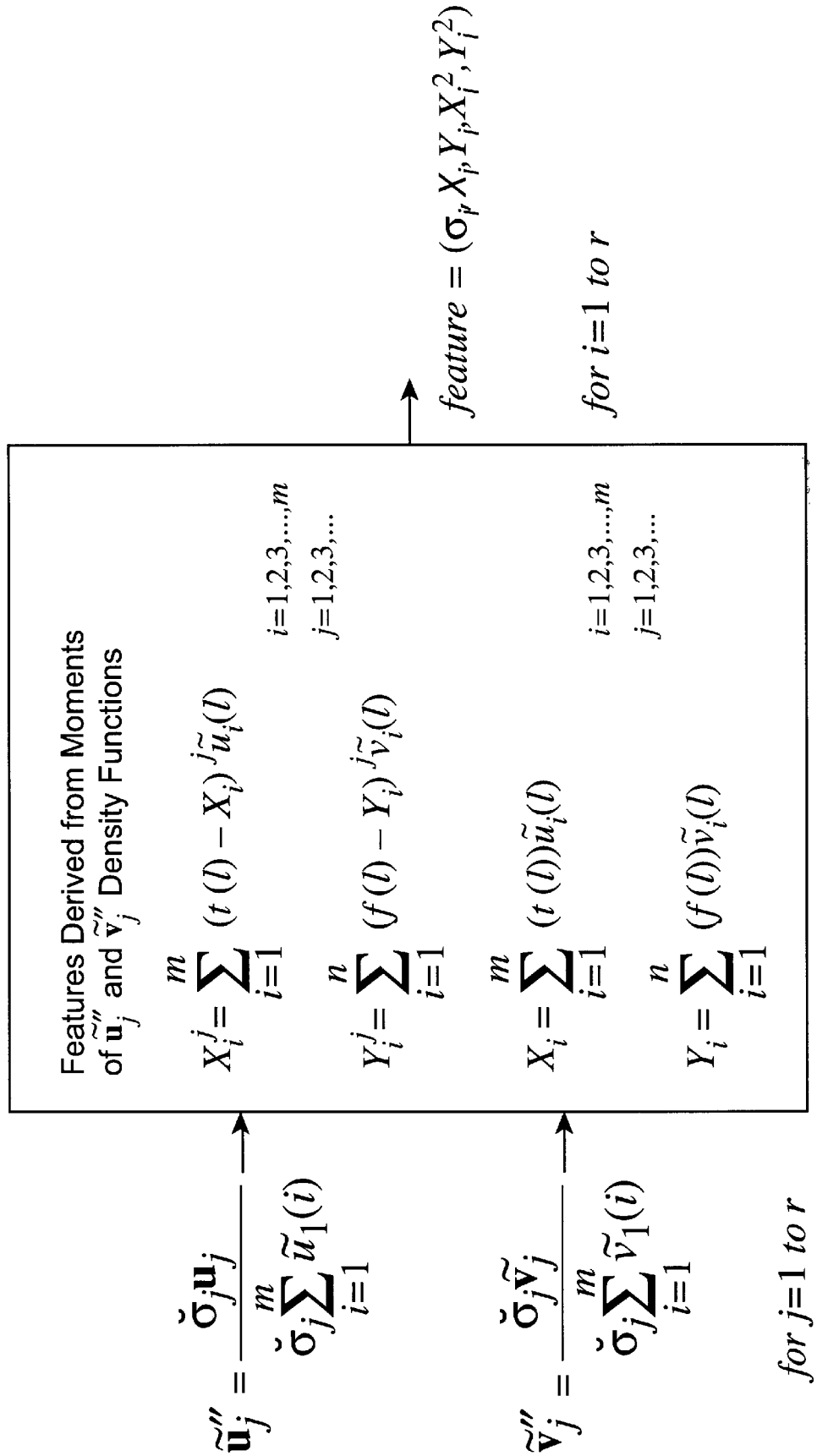
FIG. 8 is a block diagram illustrating operation of "sub system number seven" (sub system 7.0) shown in FIG. 1.

Reference is now made to FIG. 8, which depicts the operation of sub system 7, which is typically the final operation in accordance with the present invention. The operation of sub system 7 is the derivation of features from the normalized density functions. The normalized density vectors are designated as $\tilde{u}_n''$ and $\tilde{v}_n''$. The operation illustrated in FIG. 8 is carried out in sub system 7. The moments of the $\tilde{u}_n''$ and $\tilde{v}_n''$ vectors, are denoted by $X_n^i$ and $Y_n^i$ respectively. These moments are calculated as $$X_i^j = \sum_{l=1}^{m} (t(l) - X_i)^j \tilde{u}_i''(l); \quad i = 1, 2, 3, \ldots, m \qquad (26)$$

$$; j = 1, 2, 3, \ldots$$

and $$Y_i^j = \sum_{l=1}^{m} (f(l) - Y_i)^j \tilde{v}_i''(l); \quad i = 1, 2, 3, \ldots, n \qquad (27)$$

$$; j = 1, 2, 3, \ldots$$

where $$X_i = \sum_{l=1}^{m} (t(l)) \tilde{u}_i''(l); \quad i = 1, 2, 3, \ldots, m \qquad (28)$$

$$Y_i = \sum_{l=1}^{n} (f(l)) \tilde{v}_i''(l); \quad i = 1, 2, 3, \ldots, n \qquad (29)$$

These moments, along with the singular values, $\sigma_i$, constitute a set of numbers that can be used as the features for the time series process. For ease of correlating the features with time and frequency quantities, the following definitions are established:

$$\langle t^j \rangle_i = \sum_{k=1}^{m} (t_k)^j \tilde{u}_i''(k) = X_i = \sum_{l=1}^{m} (t(l)) \tilde{u}_i''(l) \qquad (30)$$

and $$\langle f^j \rangle_i = \sum_{l=1}^{n} (f_l)^j \tilde{v}_i''(l) = Y_i = \sum_{l=1}^{n} (f(l)) \tilde{v}_i''(l)$$

These equations are analogous to the spectral moments as given in equation (4). In particular, to keep the number of descriptors small only the first and second moments are used. Thus, each feature $F_i$ is given by $$F_i = (\check{\sigma}_i, \bar{t}_i, \hat{f}_i, \hat{f}_i) = (10 \log(\sigma_i/\sigma_l), <t>_i, <f>_i, \sqrt{<t^2>_i - \bar{t}_i^2}, \sqrt{<f^2>_i - \bar{f}_i^2}) \qquad (31)$$

where $\bar{t}_i$ and $\hat{t}_i$ represent the location and duration in time, $\bar{f}_i$ and $\hat{f}_i$ the location and width in frequency, and $\check{\sigma}_i$ the amplitude. In equation (26), $\check{\sigma}_i = 10 \log(\sigma_i/\sigma_l)$, where $\sigma_l$ is the largest singular value.

EXAMPLE

Referring to FIG. 9 through FIG. 12, this example demonstrates the application of the inventive method to the field of acoustic signatures for underwater vehicles. This and other examples of inventive practice are disclosed in APPENDIX A.

A goal for the operation of underwater vehicles is to be acoustically quiet. This goal is usually accomplished using techniques to dampen and eliminate vibrations that cause acoustic energy to emanate from the vehicle's mechanical structures. Measurements are conducted on the vehicle to ensure that design goals are met and that problems arising from normal use are detected and corrected.

Figure 9:
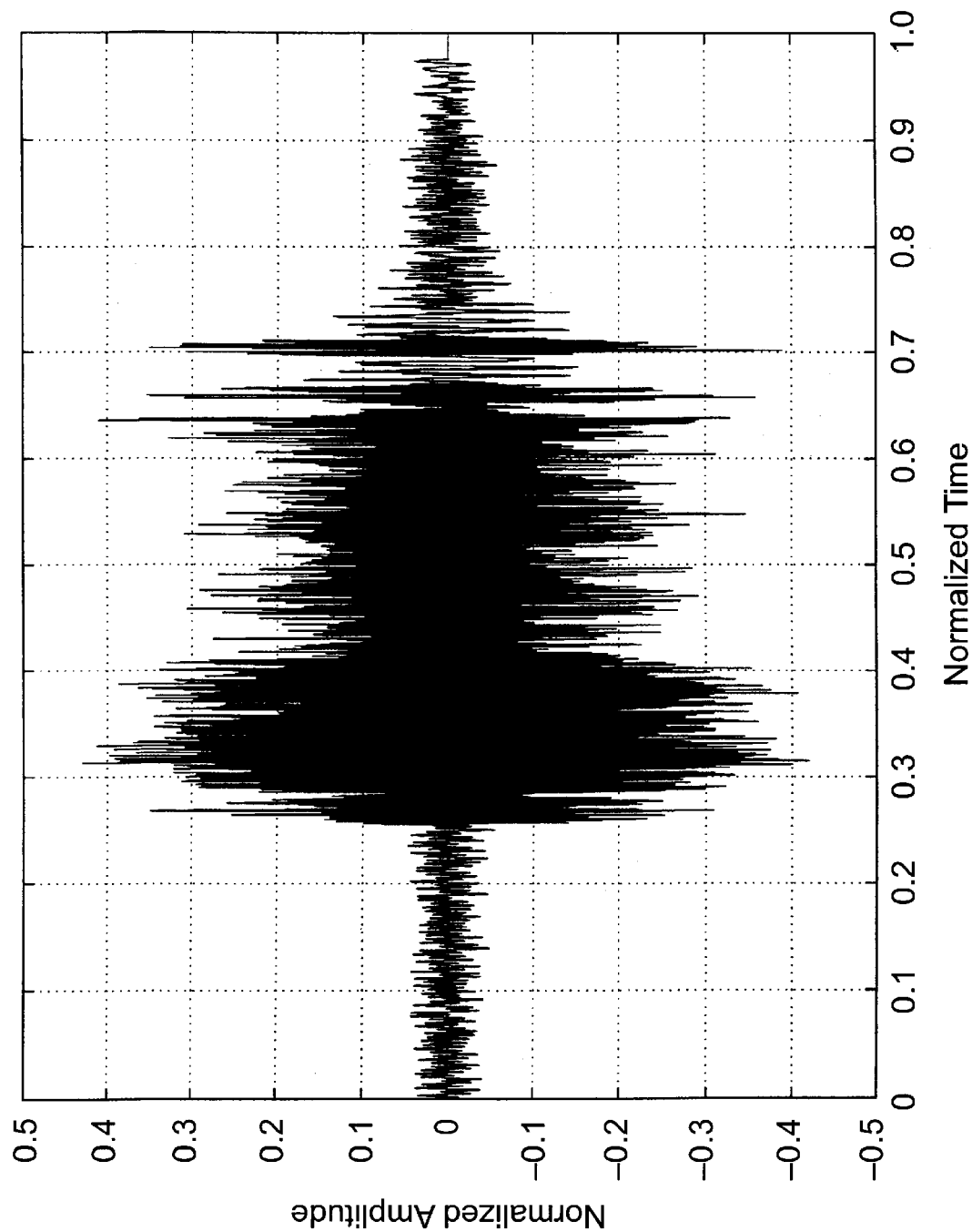
FIG. 9 is a graphical representation of the time series record for an inventive embodiment involving an underwater vehicle acoustic transient signal.

FIG. 9 is the time series record from an acoustic measurement of an underwater vehicle. The time scale has been normalized. By itself, the time series can only reveal limited information about the vibration mechanisms associated with the mechanical structures of the vehicle. The time series and frequency spectrum contain all the information about the underlying process, but by themselves may not present the best representations for extracting information about the process.

Figure 10:
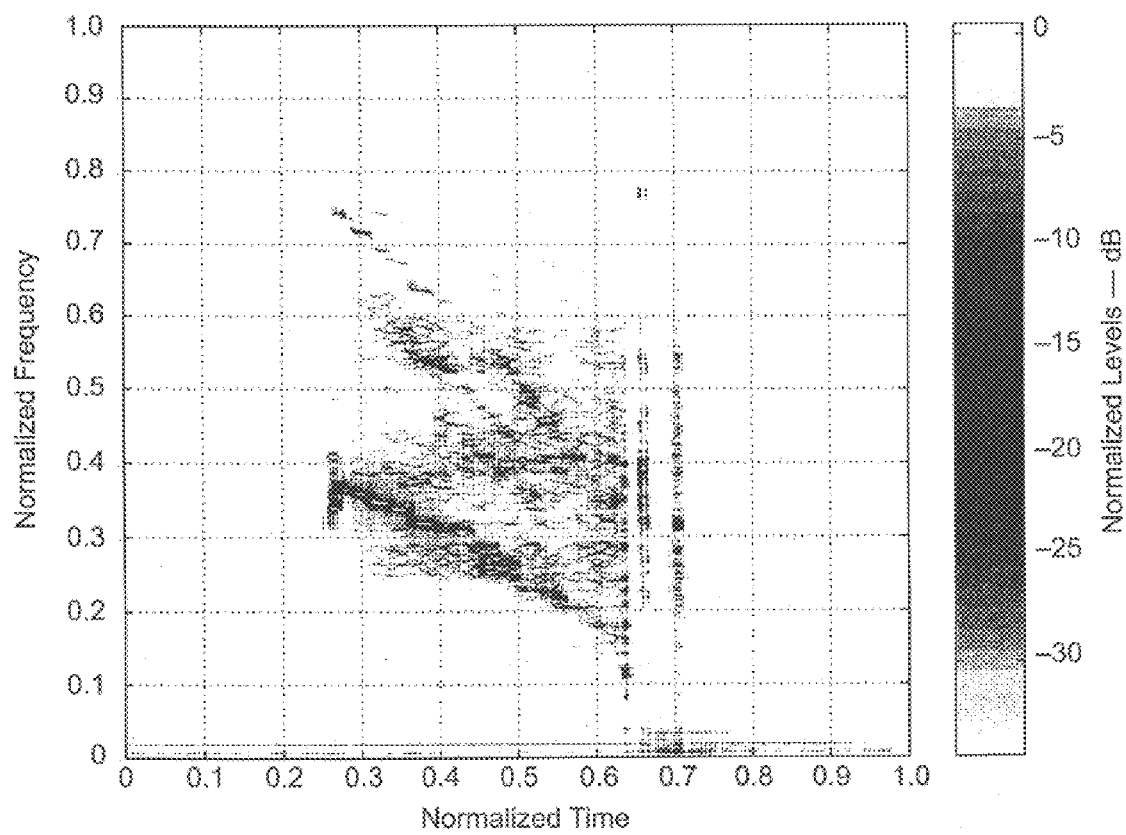
FIG. 10 is a graphical representation of the positive time-frequency distribution constructed from the time series record shown in FIG. 9.

The positive time-frequency distribution shown in FIG. 10 is derived from the time series shown in FIG. 9. The positive time-frequency information illustrated in FIG. 10 reveals the joint time-frequency energy density relationship. This can be useful in determining the nature of the vibration, its source, and corrective actions for silencing purpose.

Figure 11:
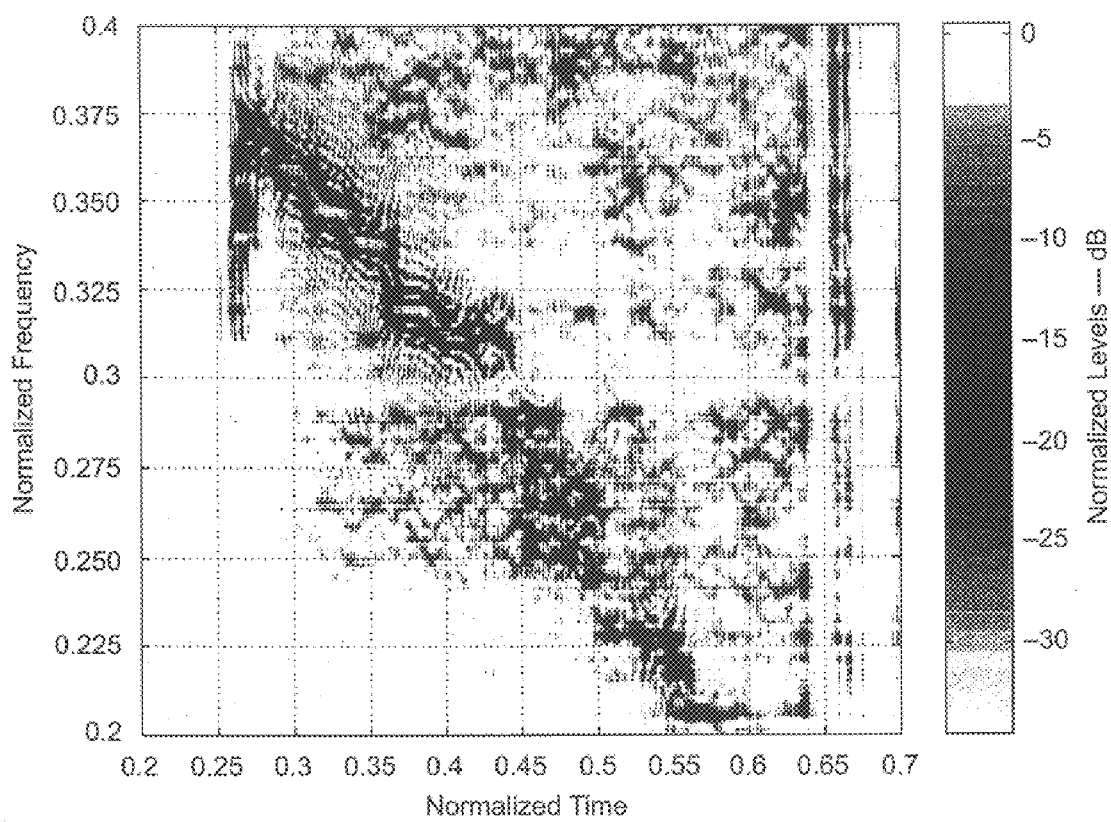
FIG. 11 is a graphical representation presenting an expanded view of the "stair step" portion of the positive time-frequency distribution shown in FIG. 10, which is constructed from the times series record shown in FIG. 9.

FIG. 11 is an expanded view of the main energy density highlights in FIG. 10. FIG. 11 illustrates a prominent stair step phenomenon.

Table 1, herein below, presents the features derived for the first six singular values/vectors. As a "rule of thumb," only the features that have $\hat{\sigma}_i \geq -10$ dB are retained.

Figure 12:
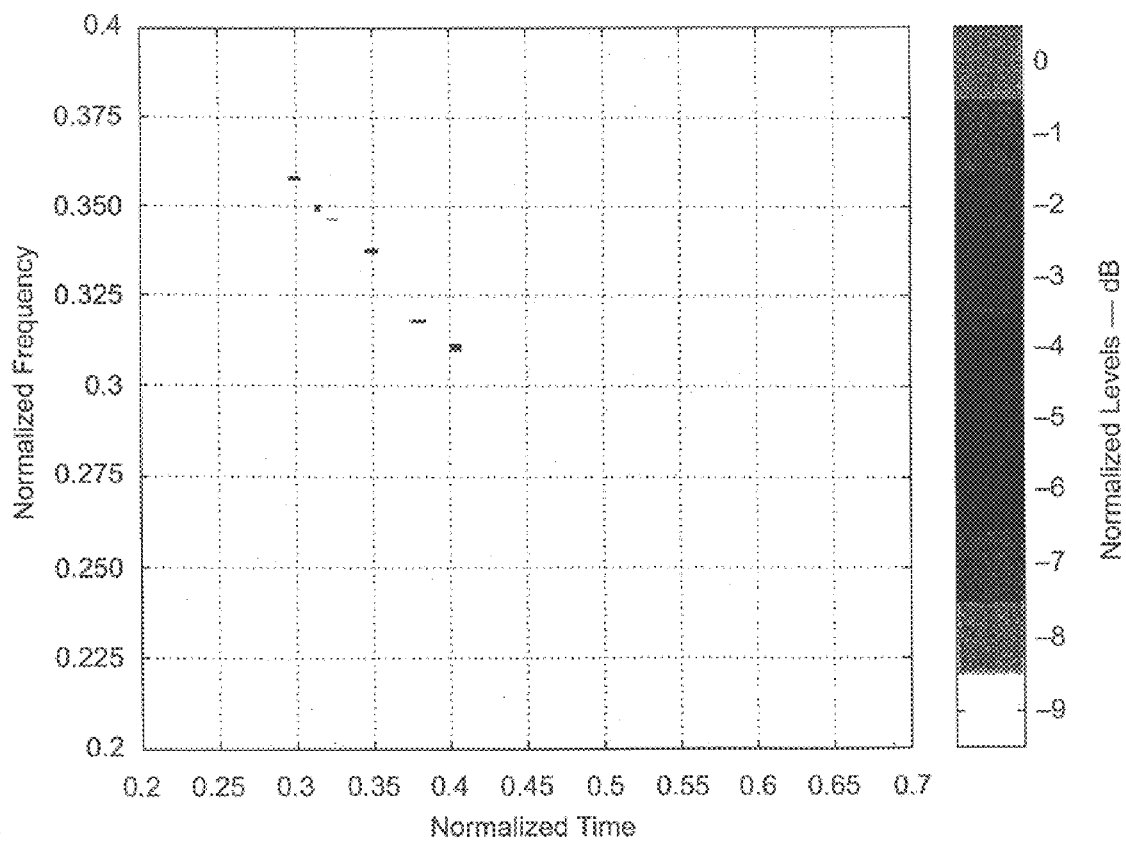
FIG. 12 is a graphical representation presenting a map image of the features for the expanded view shown in FIG. 11 of the "stair step" portion of the positive time-frequency distribution shown in FIG. 10, which is constructed from the times series record shown in FIG. 9.

The features in Table 1 are clearly associated with the energy density highlights in the stair step pattern, and this is illustrated in FIG. 12. The image in FIG. 12 follows from the feature set since each feature describes a rectangular region in the original time-frequency image. Note that the color scale shown in FIG. 12 has been expanded vis-à-vis' that shown in FIG. 11, in order to illustrate the ordering of the features.

TABLE 1

Features for underwater vehicle signal

|   | i = 1 | i = 2 | i = 3 | i = 4 | i = 5 | i = 6 |
|---|---|---|---|---|---|---|
| $\hat{\sigma}_i$ (dB) | 0 | −0.2531 | −1.3719 | −2.1255 | −3.9062 | −4.8140 |
| $\bar{t}_i$ (sec) | 0.3233 | 0.3793 | 0.3486 | 0.2985 | 0.4038 | 0.3135 |
| $\tilde{t}_i$ (sec) | 0.0043 | 0.0049 | 0.0045 | 0.0036 | 0.0036 | 0.0021 |
| $\bar{f}_i$ (Hz) | .3464 | .3183 | .3374 | .3586 | .3111 | .3501 |
| $\tilde{f}_i$ (Hz) | 0.0005 | 0.0006 | 0.0005 | 0.0008 | 0.0008 | 0.0014 |

Other embodiments of this invention will be apparent to those skilled in the art from a consideration of this specification or practice of the invention disclosed herein. Various omissions, modifications and changes to the principles described may be made by one skilled in the art without departing from the true scope and spirit of the invention which is indicated by the following claims.

What is claimed is:

1. A method for deriving features from a non-stationary time series signal, said method comprising:
    based on said signal, generating a time-frequency distribution matrix;
    decomposing said time-frequency distribution matrix;
    performing an element-by-element square of singular vectors;
    sorting the singular values and their corresponding said singular vectors in terms of non-principal said singular values and their corresponding non-principal said singular vectors, versus principal said singular values and their corresponding principal said singular vectors;
    truncating said sorted said singular values and their corresponding said singular vectors so as to remove said non-principal singular values and their corresponding said non-principal singular vectors, and so as to retain said principal singular values and their corresponding said principal singular vectors;
    formulating principal density functions, said formulating principal density functions including weighting said element-by-element square of said principal singular vectors by said principal singular values;
    normalizing said principal density functions; and
    formulating a set of principal features from said normalized principal density functions.

2. The method for deriving features as in claim 1, wherein said time-frequency distribution is any time-frequency distribution that can be obtained from Cohen's generalized formulation, wherein Cohen's generalized formulation is given by $$Q(t, f) = \frac{1}{2\pi} \int \int \int \left\{ s^*\left(u - \frac{1}{2}\tau\right) s\left(u + \frac{1}{2}\tau\right) \phi(\theta, \tau) e^{-j\theta t - j\tau 2\pi f + j\theta u} \right\} du d\tau d\theta.$$

3. The method for deriving features as in claim 1, wherein said time-frequency distribution matrix is a positive time-frequency distribution matrix.

4. The method for deriving features as in claim 1, wherein said generating a time-frequency distribution matrix includes:
    generating a prior estimate which is based on the combination of a broad band spectrogram and a narrow band spectrogram; and
    generating said time-frequency distribution matrix using said prior estimate.

5. The method for deriving features as in claim 1, wherein said decomposing said time-frequency distribution matrix includes decomposing said time-frequency distribution matrix into a series of sub-matrices, wherein each said sub-matrix is multiplied by a weight function.

6. The method for deriving features as in claim 1, wherein said performing an element-by-element square of said singular vectors includes using an element-by-element operator.

7. The method for deriving features as in claim 1, wherein said normalizing said principal density functions includes finding the sum of all values of each said principal density function, and dividing each element of said principal density functions by its corresponding sum value.

8. The method for deriving features as in claim 1, wherein said formulating a set of principal features includes deriving said principal features from the moments of said normalized principal density functions.

9. The method for deriving features as in claim 1, wherein said method comprises sensing said signal.

10. The method for deriving features as in claim 1, wherein said method comprises recording said signal.

11. A machine having a memory, said machine containing a data representation of features derived from a non-stationary time series signal, said data representation being generated, for availability for containment by said machine, by the method comprising:
    based on said signal, generating a time-frequency distribution matrix;
    decomposing said time-frequency distribution matrix;
    performing an element-by-element square of singular vectors;
    sorting the singular values and their corresponding said singular vectors in terms of non-principal said singular values and their corresponding non-principal said singular vectors, versus principal said singular values and their corresponding principal said singular vectors;
    truncating said sorted said singular values and their corresponding said singular vectors so as to remove said non-principal singular values and their corresponding said non-principal singular vectors, and so as to retain said principal singular values and their corresponding said principal singular vectors;

formulating principal density functions, said formulating principal density functions including weighting said element-by-element square of said principal singular vectors by said principal singular values;

normalizing said principal density functions; and formulating a set of principal features from said normalized principal density functions.

12. The machine having a memory as in claim 11, wherein said time-frequency distribution is any time-frequency distribution that can be obtained from Cohen's generalized formulation, wherein Cohen's generalized formulation is given by $$Q(t, f) = \frac{1}{2\pi} \int \int \int \left\{ s^*\left(u - \frac{1}{2}\tau\right) s\left(u + \frac{1}{2}\tau\right) \phi(\theta, \tau) e^{-j\theta t - j\tau 2\pi f + j\theta u} \right\} du\, d\tau\, d\theta.$$

13. The machine having a memory as in claim 11, wherein said time-frequency distribution matrix is a positive time-frequency distribution matrix.

14. The machine having a memory as in claim 11, wherein said generating a time-frequency distribution matrix includes:
generating a prior estimate which is based on the combination of a broad band spectrogram and a narrow band spectrogram; and
generating said time-frequency distribution matrix using said prior estimate.

15. The machine having a memory as in claim 11, wherein said decomposing said time-frequency distribution matrix includes decomposing said time-frequency distribution matrix into a series of sub-matrices, wherein each said sub-matrix is multiplied by a weight function.

16. The machine having a memory as in claim 11, wherein said performing an element-by-element square of said singular vectors includes using an element-by-element operator.

17. The machine having a memory as in claim 11, wherein said normalizing said principal density functions includes finding the sum of all values of each said principal density function, and dividing each element of said principal density functions by its corresponding sum value.

18. The machine having a memory as in claim 11, wherein said formulating features includes deriving said features from the moments of said normalized principal density functions.

19. A memory for storing data for access by an application program being executed on a processing system, said memory comprising a data representation of features derived from a non-stationary time series signal, said data representation being stored in said memory and including information resident in a database used by said application program, said data representation being generated, for availability for storage in said memory, by the method comprising:

based on said signal, generating a time-frequency distribution matrix;

decomposing said time-frequency distribution matrix;

performing an element-by-element square of singular vectors;

sorting the singular values and their corresponding said singular vectors in terms of non-principal said singular values and their corresponding non-principal said singular vectors, versus principal said singular values and their corresponding principal said singular vectors;

truncating said sorted said singular values and their corresponding said singular vectors so as to remove said non-principal singular values and their corresponding said non-principal singular vectors, and so as to retain said principal singular values and their corresponding said principal singular vectors;

formulating principal density functions, said formulating principal density functions including weighting said element-by-element square of said principal singular vectors by said principal singular values;

normalizing said principal density functions; and formulating a set of principal features from said normalized principal density functions.

20. The memory for storing data as in claim 19, wherein said time-frequency distribution is any time-frequency distribution that can be obtained from Cohen's generalized formulation, wherein Cohen's generalized formulation is given by $$Q(t, f) = \frac{1}{2\pi} \int \int \int \left\{ s^*\left(u - \frac{1}{2}\tau\right) s\left(u + \frac{1}{2}\tau\right) \phi(\theta, \tau) e^{-j\theta t - j\tau 2\pi f + j\theta u} \right\} du\, d\tau\, d\theta.$$

21. The memory for storing data as in claim 19, wherein said time-frequency distribution matrix is a positive time-frequency distribution matrix.

22. The memory for storing data as in claim 19, wherein said generating a time-frequency distribution matrix includes:
generating a prior estimate which is based on the combination of a broad band spectrogram and a narrow band spectrogram; and
generating said time-frequency distribution matrix using said prior estimate.

23. The memory for storing data as in claim 19, wherein said decomposing said time-frequency distribution matrix includes decomposing said time-frequency distribution matrix into a series of sub-matrices, wherein each said sub-matrix is multiplied by a weight function.

24. The memory for storing data as in claim 19, wherein said performing an element-by-element square of said singular vectors includes using an element-by-element operator.

25. The memory for storing data as in claim 19, wherein said normalizing said principal density functions includes finding the sum of all values of each said principal density function, and dividing each element of said principal density functions by its corresponding sum value.

26. The memory for storing data as in claim 19, wherein said formulating features includes deriving said features from the moments of said normalized principal density functions.

27. The method for deriving features as in claim 1, wherein said time-frequency distribution matrix is a non-positive time-frequency distribution matrix.

28. The machine having a memory as in claim 11, wherein said time-frequency distribution matrix is a non-positive time-frequency distribution matrix.

29. The memory for storing data as in claim 19, wherein said time-frequency distribution matrix is a non-positive time-frequency distribution matrix.

* * * * *